(12) United States Patent
Ihns

(10) Patent No.: US 10,440,293 B1
(45) Date of Patent: Oct. 8, 2019

(54) AVIONICS IMAGING CONTROL METHOD AND APPARATUS

(71) Applicant: Jurgen R. Ihns, Gulf Breeze, FL (US)

(72) Inventor: Jurgen R. Ihns, Gulf Breeze, FL (US)

( * ) Notice: Subject to any disclaimer, the term of this patent is extended or adjusted under 35 U.S.C. 154(b) by 0 days.

(21) Appl. No.: 16/105,271

(22) Filed: Aug. 20, 2018

Related U.S. Application Data

(60) Provisional application No. 62/688,593, filed on Jun. 22, 2018.

(51) Int. Cl.
| | |
|---|---|
| H04N 5/33 | (2006.01) |
| G06K 9/00 | (2006.01) |
| G08G 5/00 | (2006.01) |
| B64D 43/00 | (2006.01) |
| B64D 47/08 | (2006.01) |

(52) U.S. Cl.
CPC ............ *H04N 5/332* (2013.01); *B64D 43/00* (2013.01); *B64D 47/08* (2013.01); *G06K 9/0063* (2013.01); *G08G 5/0047* (2013.01); *G08G 5/0052* (2013.01); *G06K 2009/00644* (2013.01)

(58) Field of Classification Search
None
See application file for complete search history.

(56) References Cited

U.S. PATENT DOCUMENTS

| | | | | |
|---|---|---|---|---|
| 5,909,244 | A * | 6/1999 | Waxman | ............... H04N 5/335 348/222.1 |
| 6,898,331 | B2 | 5/2005 | Tiana | |
| 7,148,861 | B2 | 12/2006 | Yelton et al. | |
| 7,196,329 | B1 | 3/2007 | Wood et al. | |
| 7,924,312 | B2 | 4/2011 | Packard | |
| 9,569,848 | B2 | 2/2017 | O'Dell et al. | |
| 2002/0150304 | A1* | 10/2002 | Ockman | ................... G06T 5/50 382/260 |
| 2008/0099678 | A1* | 5/2008 | Johnson | ................... G01J 5/02 250/332 |

(Continued)

OTHER PUBLICATIONS

Mudau et al.: "Non-Uniformity Correction and Bad Pixel Replacement on LWIR and MWIR Images"; believed to have been published no later than Sep. 30, 2016.

(Continued)

*Primary Examiner* — Fernando Alcon
(74) *Attorney, Agent, or Firm* — Bryan W. Bockhop; Bockhop Intellectual Property Law, LLC

(57) ABSTRACT

An aircraft imaging apparatus includes a thermal imaging camera, a control circuit, an image generating circuit and a display. The thermal imaging camera includes an array of pixels and that senses thermal radiation within the scene. The a control circuit is programmed to: detect an area of high thermal energy within the image; define a region of interest having a predetermined number of pixels within the area of high thermal energy; determine an average temperature sensed by the predetermined number of pixels; and adjust each of the plurality of adjustable parameters to optimal settings corresponding to the average temperature. The image generating circuit is operationally coupled to the thermal imaging camera and generates image data corresponding to a portion of the scene so that the image data is based on the optimal settings for the plurality of adjustable parameters. The display displays the image data.

26 Claims, 4 Drawing Sheets

(56) References Cited

U.S. PATENT DOCUMENTS

| | | | |
|---|---|---|---|
| 2010/0309315 A1 | 12/2010 | Hogasten et al. | |
| 2011/0001809 A1* | 1/2011 | McManus | G01J 5/02 |
| | | | 348/61 |
| 2011/0235939 A1* | 9/2011 | Peterson | G06T 5/003 |
| | | | 382/266 |
| 2013/0236098 A1* | 9/2013 | Fujisaki | G06T 7/136 |
| | | | 382/171 |
| 2013/0242110 A1* | 9/2013 | Terre | H04N 5/2251 |
| | | | 348/164 |
| 2014/0139643 A1* | 5/2014 | Hogasten | H01L 27/14609 |
| | | | 348/48 |
| 2015/0172545 A1* | 6/2015 | Szabo | H04N 5/23238 |
| | | | 348/36 |
| 2015/0189192 A1* | 7/2015 | Jonsson | G06T 5/50 |
| | | | 348/164 |
| 2016/0093034 A1* | 3/2016 | Beck | G06T 5/50 |
| | | | 345/617 |
| 2016/0165202 A1* | 6/2016 | Lee | H04N 5/2258 |
| | | | 348/164 |
| 2017/0078591 A1* | 3/2017 | Petrov | H04N 5/332 |
| 2017/0337754 A1* | 11/2017 | Wang | B64D 43/02 |
| 2019/0026875 A1* | 1/2019 | Yuan | G06T 5/50 |

OTHER PUBLICATIONS

Yelton et al.: "Processing System for an Enhanced Vision System"; Apr. 2004; SPIE.

* cited by examiner

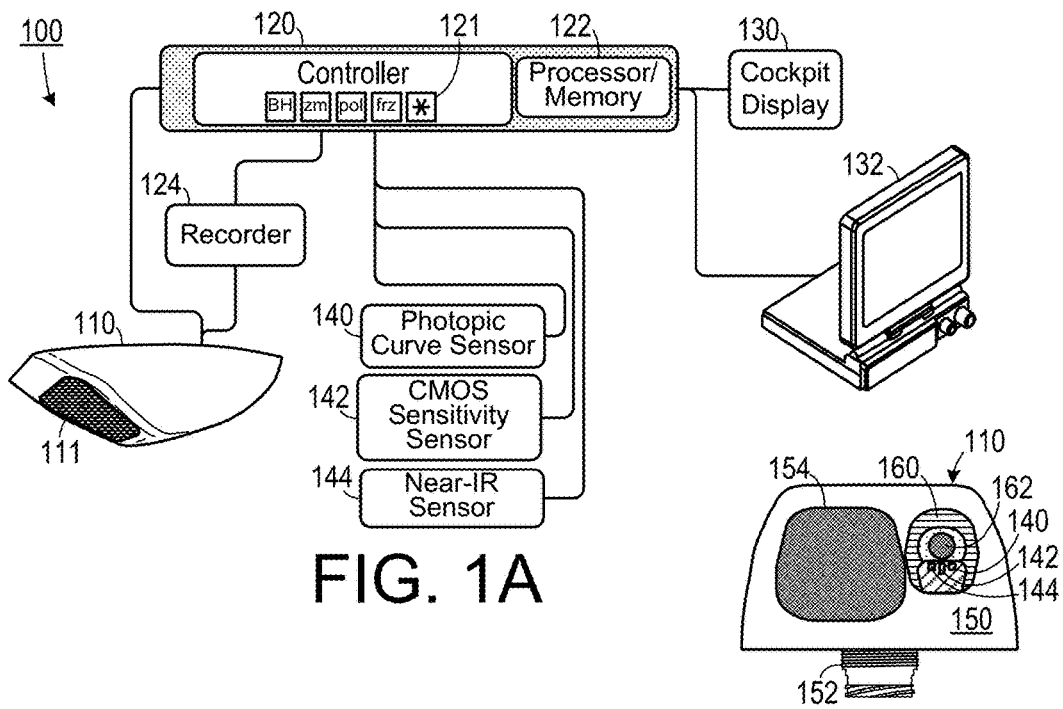
FIG. 1A
FIG. 1B
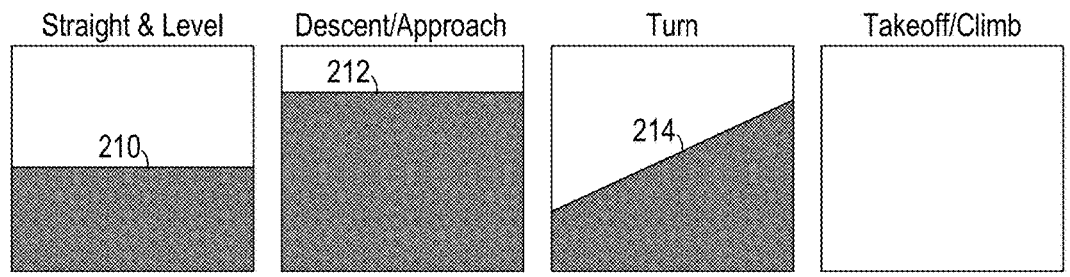
FIG. 2A  FIG. 2B  FIG. 2C  FIG. 2D
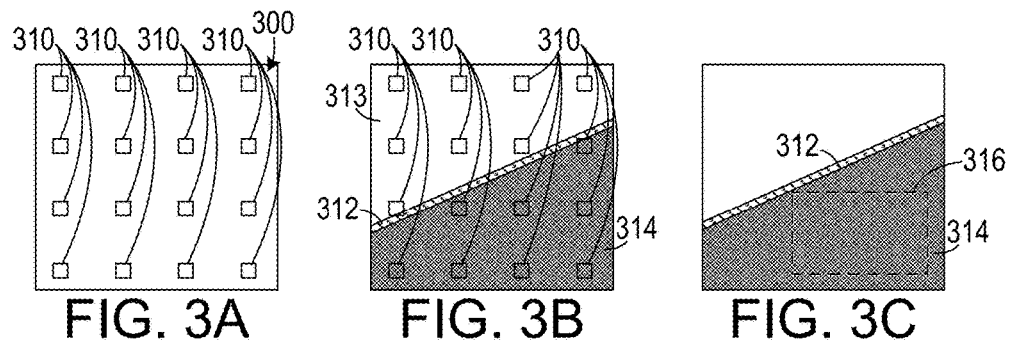
FIG. 3A  FIG. 3B  FIG. 3C

AVIONICS IMAGING CONTROL METHOD AND APPARATUS

CROSS-REFERENCE TO RELATED APPLICATION(S)

This application claims the benefit of U.S. Provisional Patent Application Ser. No. 62/688,593, filed Jun. 22, 2018, the entirety of which is hereby incorporated herein by reference.

BACKGROUND OF THE INVENTION

1. Field of the Invention

The present invention relates to avionics systems and, more specifically, to an avionics imaging system

2. Description of the Related Art

Many aircraft employ imaging systems to assist the pilot in seeing what is in front of the aircraft. Some imaging systems employ a visible light camera to capture real time video, which is displayed on a screen in the cockpit. Such systems can be useful in showing areas blocked by the nose of the aircraft and, thereby, avoiding potential hazards. Some systems employ cameras that are sensitive to wavelengths either that are outside of the average visible light spectrum or that are on the periphery of the average visible light spectrum. These systems provide video information to pilots when the availability of ordinary visual light is limited, such as at dusk. Many aircraft employ displays that show the outputs from both visual light cameras and long wave infrared (LWIR) cameras.

Such cameras can be temperature sensitive and temperature is a function factors such as elevation and weather conditions. So when an aircraft climbs, the ambient temperature decreases and, as a result, any external electronic cameras typically become more sensitive. Similarly, as the aircraft descends, any external electronic cameras typically become less sensitive. Pilots employing external cameras (such as visual light cameras and long wave infrared cameras) often have to adjust the intensity of images being displayed from the cameras as they change altitude. In fact, many aircraft video systems allow the pilot to adjust several different parameters to optimize the display for different camera conditions. Such adjustments can become distracting during higher intensity maneuvers like while on final approach and shortly after takeoff.

The time of day often determines which type of image is most important to a pilot. During broad daylight infrared images are usually of little use to the pilot and the pilot generally relies on visual light images. Conversely, at nighttime there is little visual light available to an imaging system (other than runway lights, etc.) and the pilot will make use of images based on infrared radiation. At dusk, during the period as daytime transitions into nighttime, a blending of visual light data and infrared radiation data can be useful in constructing an image to be displayed to the pilot. However, the relative availability of visual light versus infrared radiation changes quickly at dusk and, therefore, pilots often either have to adjust the visual light and infrared radiation intensities of the cockpit display or fly while viewing a sub-optimal image.

Therefore, there is a need for an avionics imaging system that automatically adjusts an image display based on sensed physical conditions so as to generate an optimal image, thereby minimizing distractions to the pilot.

SUMMARY OF THE INVENTION

The disadvantages of the prior art are overcome by the present invention which, in one aspect, an imaging apparatus for imaging a scene that includes a thermal imaging camera, a control circuit, an image generating circuit and a display. The thermal imaging camera includes an array of pixels and that senses thermal radiation within the scene. The a control circuit is programmed to: detect an area of high thermal energy within the image; define a region of interest having a predetermined number of pixels within the area of high thermal energy; determine an average temperature sensed by the predetermined number of pixels; and adjust each of the plurality of adjustable parameters to optimal settings corresponding to the average temperature. The image generating circuit is operationally coupled to the thermal imaging camera and generates image data corresponding to a portion of the scene so that the image data is based on the optimal settings for the plurality of adjustable parameters. The display displays the image data.

In another aspect, the invention is an aircraft imaging apparatus for imaging a scene that includes a visual light camera. A temperature sensor detects a temperature associated with the visual light camera. A control circuit, including a memory, adjusts a plurality of parameters associated with the visual light camera as a function of the temperature so as to generate an optimal image.

In another aspect, the invention is an image blending system that includes a visible light camera, a thermal imaging camera, a visible light sensitivity sensor, a long wave-IR sensor, an image generating circuit and a display. The visible light camera includes an array of pixels that sense visible light within a scene. The thermal imaging camera includes an array of pixels that sense thermal radiation within the scene. The visible light sensitivity sensor detects an intensity of visible light available to the visible light camera. The long wave-IR sensor detects an intensity of infra-red energy available to the thermal imaging camera. The image generating circuit is operationally coupled to the visible light camera and the thermal imaging camera. The image generating circuit is configured to blend image data from the thermal imaging camera with image data from the visible light camera proportionally based on the intensity of visible light available to the visible light camera and the intensity of infra-red energy available to the thermal imaging camera so as to generate blended image data that shows the scene so as to be optimally perceptible by a user. The display is configured to display the blended image data.

In another aspect, the invention is a method of calibrating a thermal imaging system that generates an image onto a display, in which the image is affected by a plurality of adjustable parameters. An image of a scene is received from a thermal camera. An area of high thermal energy is detected within the image. A region of interest having a predetermined number of pixels is defined within the area of high thermal energy. An average temperature sensed by the predetermined number of pixels is determined. Each of the plurality of adjustable parameters is adjusted to an optimal setting corresponding to the average temperature.

In yet another aspect, the invention is a method of generating a display. An image of a scene is received from a thermal camera. An intensity of visible light available to the visible light camera is detected. An intensity of infra-red energy available to the thermal imaging camera is detected.

Image data from the thermal imaging camera is blended with image data from the visible light camera proportionally based on the intensity of visible light available to the visible light camera and the intensity of infra-red energy available to the thermal imaging camera so as to generate blended image data that, when displayed, shows the scene so as to be optimally perceptible by a user.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

FIG. 1A is a schematic diagram of one embodiment of an avionics imaging system.

FIG. 1B is a schematic diagram of an aircraft imaging system camera unit.

FIGS. 2A-2D are a series of screen views showing different aircraft attitudes.

FIG. 3A shows a scene sampling grid.

FIG. 3B shows a scene sampling grid used to determine a horizon.

FIG. 3C shows an area of interest used in determining a scene temperature.

FIG. 9B is a representation of an infra-red image of the runway approach shown in

FIG. 9A.

DETAILED DESCRIPTION OF THE INVENTION

Figure 4:
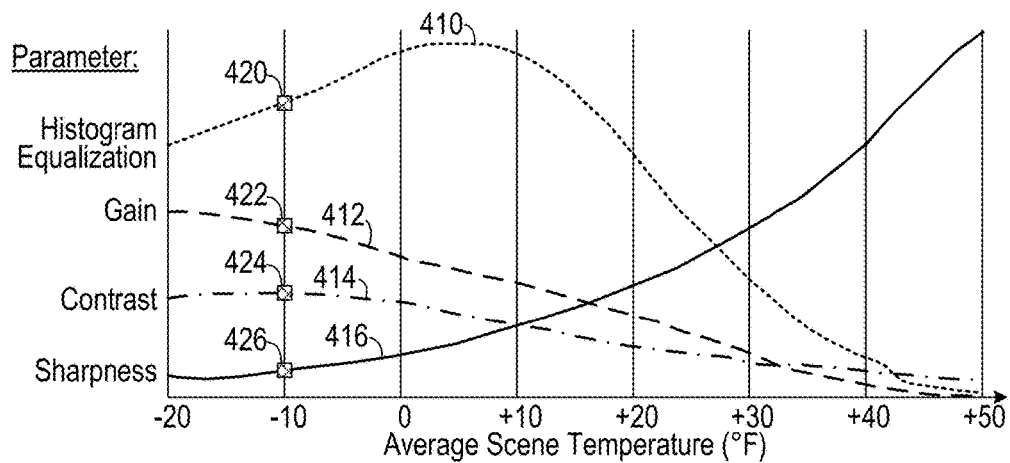
FIG. 4 is a graph showing parameter values and settings corresponding to different scene temperatures.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on." As used herein, "thermal imaging camera" includes any type of camera or other video sensor that is sensitive to thermal energy and capable of providing image data based thereon.

As shown in FIGS. 1A and 1B, one embodiment of an avionics imaging apparatus 100 includes a video sensor unit 110 that senses real time video imagery of a scene and that is coupled to a control unit 120, which includes a digital processor (or a micro-controller) and on-board memory 122. A recorder 124, which could include a conventional non-volatile memory and which is in data communication with the video sensor unit 110 and the control unit 120, can be used for long term data storage (such as video data storage). The control unit 120 provides video data to at least one of a cockpit display 130 and to a portable display unit 132. A plurality of selection buttons 121 provide a user interface between the pilot and the system.

The video sensor unit 110 includes a visual light camera 154 that is coupled to the control unit 120 and a secondary video region 160 in which is mounted a near infra-red camera 162 that is coupled to the control unit 120. The visual light camera 154 could include, for example, a Python 1300 CMOS camera available from ON Semiconductor, Phoenix, Ariz. 85008. The near infra-red camera 162 could include, for example, a Taramisk series or Tenum series thermal imaging camera available from DRS Technologies, Inc., Dallas, Tex. or a TAU series long wave camera available from FLIR Systems, Wilsonville, Oreg. These digital cameras include an array of radiation-sensing pixels on a semiconductor chip. An aerodynamic screen 111 is placed in front of the video sensor unit 110 to minimize aerodynamic effects at high speeds. A mounting unit 152 facilitates mounting the video sensor unit 110 to the fuselage of an aircraft (typically to the underside of the nose).

Three photodiodes are also coupled to the control unit 120 and can be embedded in the video sensor unit 110. The photodiodes can include: a first photodiode 140 configured to sense bright visible light (e.g., in the 10 lux to 200,000 lux range), a second photodiode 142 configured to sense moderately bright visible light (e.g., in the 0.1 lux to 100,000 lux range), and a photodiode 144 configured to sense low luminance visible and long wave infrared light (e.g., in the 0.001 lux to 10,000 lux range).

The system can adjust the images generated by the a near infra-red camera 162 and the visual light camera 154 by detecting a temperature associated with each camera and adjusting a plurality of parameters associated with the cameras as a function of the temperature so as to generate an optimal image. The temperature can be a temperature measured near the camera, or it can be based on a scene temperature.

The cockpit views of the horizon for several different aircraft attitudes are shown in FIGS. 2A-2D. For example, a straight and level view of the horizon 210 is shown in FIG. 2B, a descending view (such as during a runway approach) of the horizon 212 is shown in FIG. 2B, a right turn view of the horizon 214 is shown in FIG. 2C and a steep climb (such as during takeoff) view is shown in FIG. 2D. The system is configured to identify a region of interest, which is a defined region that it likely to radiate a high level of thermal energy (such as land during dusk), in the scene viewed by the cameras in the video sensor unit 110. In one embodiment, as shown in FIGS. 3A-3C, the system determines where the horizon is by sampling a grid 300 of evenly spaced-apart pixels 310 (or groups of pixels in some embodiments) in the scene viewed by the visual camera. It then interpolates pixels sensing light intensities corresponding to the sky 313 (an area of relatively low thermal energy) with light intensities corresponding to land 314 (an area of relatively high thermal energy) and interpolates a horizon 312 from this information. The system then selects a region of interest 316 (typically rectangular) in the land area below the horizon 312 or in the sky (depending on aircraft attitude).

Figure 5A:
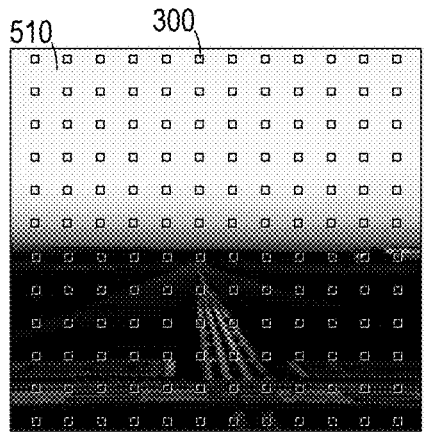
FIGS. 5A-5D are a series of screen images showing determination of average scene temperature and an image resulting from adjusting image parameters based on the average scene temperature.
Figure 5B:
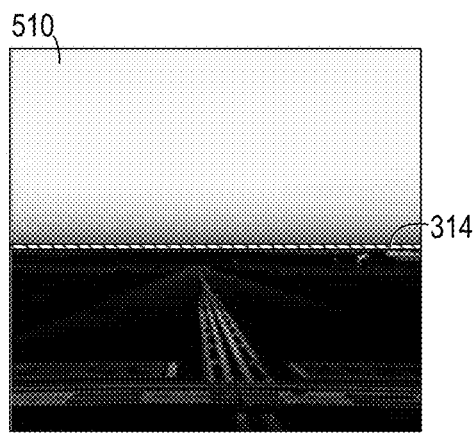
Figure 5C:
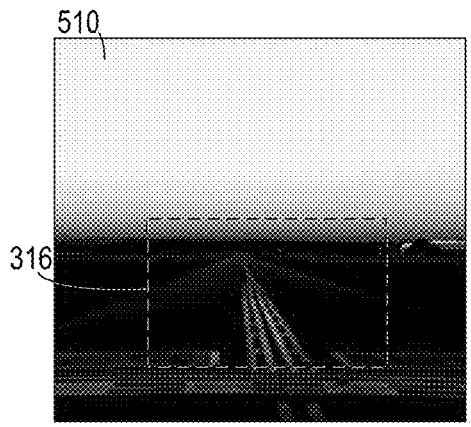
Figure 5D:
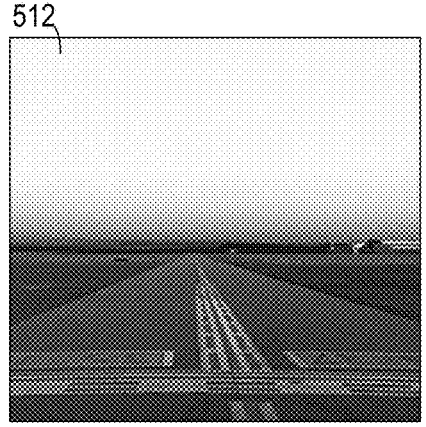

From this region of interest 316, the system determines an average scene temperature (which could be measured by using a radiometric mode of the near infra-red camera 162) and adjusts various video parameters for optimal response to the scene temperature according to an optimal setting graph, as shown in FIG. 4. The graph can include optimal setting curves for parameters such as: histogram equalization 410; gain 412; contrast 414 and sharpness 416. (It will be understood that other parameters of interest may also be adjusted automatically by the system and that selection of the parameters to be autotuned will depend upon the specific embodiment.) For example, if the average scene temperature is minus 10° F., then the histogram equalization will be set at the 420 level; gain will be set at the 422 level; contrast will be set at the 414 level and sharpness will be set at the 416 level. All of these settings will be done by the control unit 120 automatically, which frees up the pilot for other tasks and which achieves an optimal display. In one embodiment, the system employs a lookup table stored in memory with which the control unit 120 accesses the parameter settings as a function of average scene temperature. The lookup table includes a plurality of average scene temperatures and an optimal set point for each parameter corresponding to each of the average scene temperatures in the table. This autotune functionality can be used with a system that includes only a LWIR camera or it can be used with a system that includes both a LIWR camera and visible light camera A practical example is shown in FIGS. 5A-5D. In FIG. 5A, a sub-optimal scene 510 is displayed and the system employs grid 300 to determine the horizon 314, as shown in FIG. 5B. The area of interest 316 is assigned and is sampled in FIG. 5C, which results in optimal setting of the video parameters. This results in an optimal display of the scene 512, as shown in FIG. 5D.

Figure 6A:
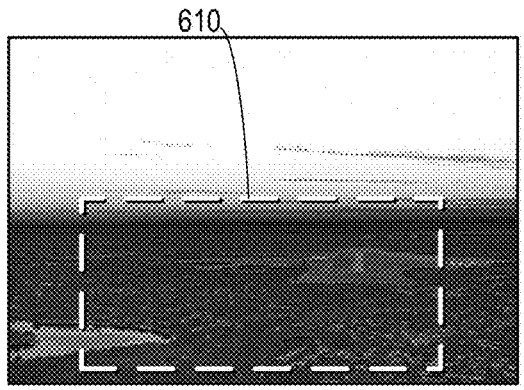
FIGS. 6A-6D are images showing several different preset areas of interest corresponding to different aircraft attitudes.
Figure 6B:
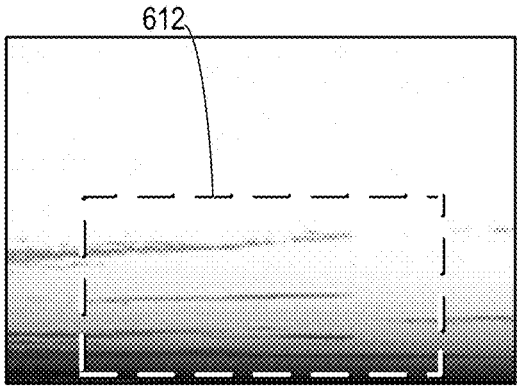
Figure 6C:
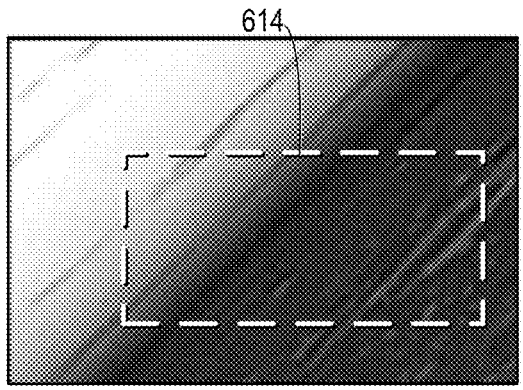
Figure 6D:
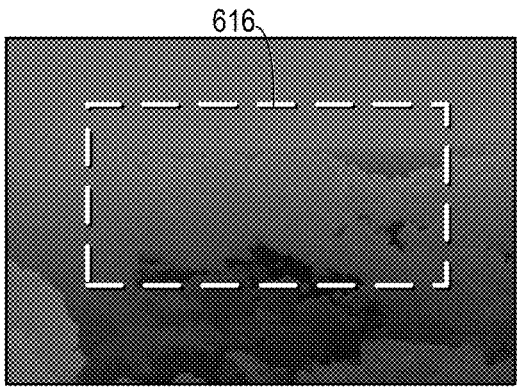

As shown in FIGS. 6A through 6D, the control unit 120 can receive platform data from the aircraft's instruments, such as the attitude indicator, altimeter, airspeed indicator, etc. to determine where the likely horizon is relative to the camera view and then apply preset areas of interest to where land area is expected. Some typical modes of interest include: taxi, climb/take-off, cruse and descent/approach. For example, as shown in FIG. 6A, preset area of interest 610 is applied when runway approach is detected; in FIG. 6B, preset area of interest 612 is applied when a climb is detected; in FIG. 6C, preset area of interest 614 is applied when a right turn is detected; and in FIG. 6D, preset area of interest 616 is applied when straight and level flight at altitude is detected. Additional platform data that can be used in this embodiment can include: outside air temperature, indicated air speed, pitch data, yaw data, roll data, etc. The use of preset areas of interest reduces computational complexity associated with determining average scene temperature.

Figure 7A:
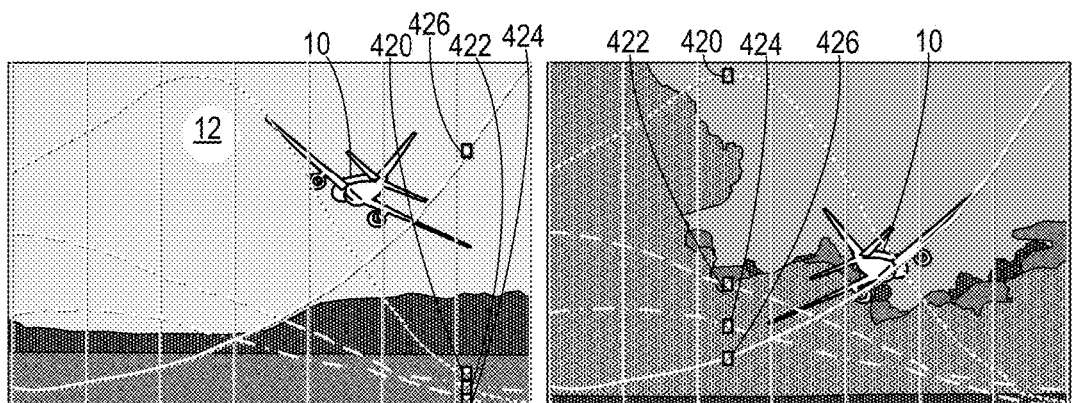
FIG. 7A is a parameter chart superimposed on an image of an aircraft flying in the direction of the sun.
Figure 7B:
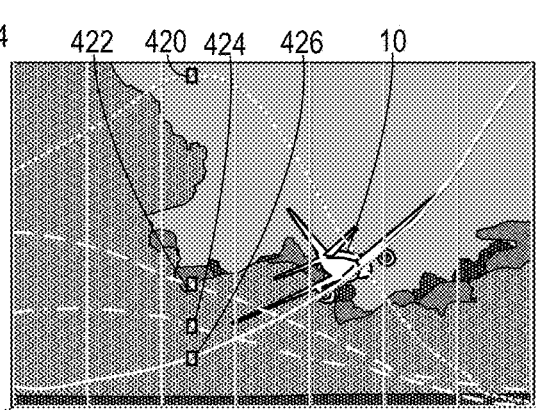
FIG. 7B is a parameter chart superimposed on an image of an aircraft flying in the direction of a relatively cool scene.

Two examples of parameter setting are show in FIGS. 7A and 7B. In FIG. 7A, the aircraft 10 is generally flying toward the sun 12 and parameters 420, 422, 424 and 426 are set to high average scene temperature settings. In FIG. 7B, the aircraft 10 is flying into a relative cool region and, correspondingly, parameters 420, 422, 424 and 426 are set to low average scene temperature settings.

Figure 8:
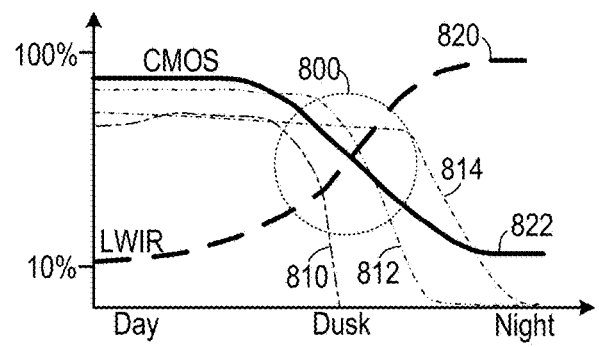
FIG. 8 is a graph showing adjustment of visual images and infra-red images under different lighting conditions.

The system responds to changing lighting conditions, for example, at different times during the day. As shown in FIG. 8, the output 810 from the first photodiode 140 indicates the amount of bright visible light available. The output 812 from the second photodiode 142 indicates the availability of moderately bright visible light. The output 814 of the third photodiode 144 indicates the availability of near infra-red energy. During broad daylight, a large amount of visible light, which is detectable with a CMOS camera, is available and long wave infra-red radiation is of relatively less importance. At night, very little visible light is available, whereas long wave infra-red energy is more useful in scene generation. During dusk 800 both visible light and long wave infra-red energy are useful in scene generation, but the relative amounts of each that should be blended into the scene displayed on the cockpit display are varied as lighting conditions change. Available light and IR radiation conditions change rapidly during dusk 800 and the relative values of the photodiode outputs exhibit considerably different patterns for each light/IR radiation condition. The system senses these intensities and generates relative intensity settings for the visual light image 820 and for the infra-red image 822 proportionally, based on the detected types of radiation available for imaging, so as to display an optimal blended image on the cockpit display.

To do this, the photodiodes 140, 142 and 144 sense the availability of each type of radiation (i.e., visual light vs. infra-red) and the control unit 120 then adjusts the signals from each of the visual light CMOS camera 154 and the near infra-red camera 162 to achieve an image with an optimal amount of contrast and sharpness for the available radiation conditions. The control unit 120 can determine the camera settings based on a lookup table stored in memory that gives the camera setting data for each camera as a function of current photodiode values. To control relative image intensity, the control unit 120 can adjust the "shutter speed" of each camera. In the case of digital cameras, the "shutter speed" is the frame data capture rate for the sensor chip, wherein longer periods between data capture result in more intense images.

Figure 9A:
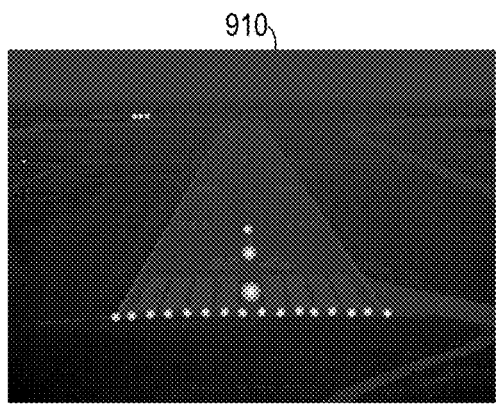
FIG. 9A is a representation of a visual image of a runway approach at dusk.
Figure 9B:
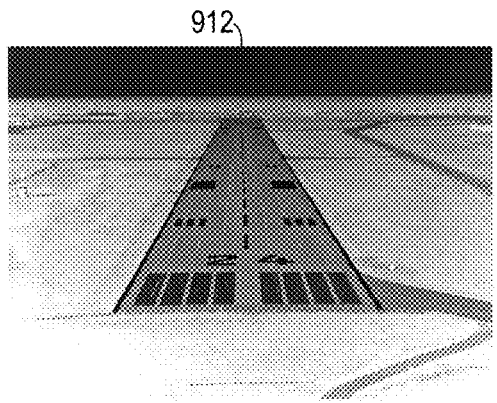
Figure 9C:
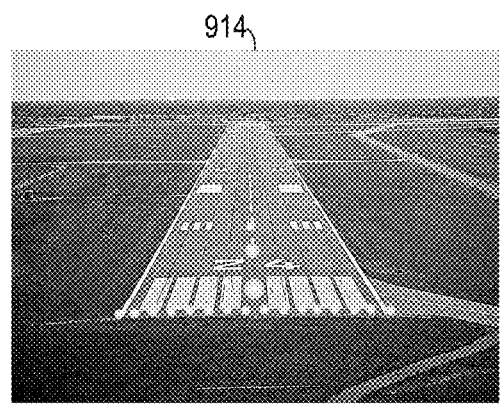
FIG. 9C is a representation of a blending of the visual image and the infra-red image of the runway approach shown in FIGS. 9A and 9B.

A simulated example is shown in FIGS. 9A through 9C, in which image 910 corresponds to a scene from the visual light CMOS camera at dusk and image 912 corresponds to a scene from the near infra-red camera. Image 914 is a simulated image showing blending of the data from the two cameras, with the image intensity of each based on input from photodiodes.

In another embodiment, the system can be used to blend data from a long wave infra-red (LWIR) camera with data from a short wave infrared (SWIR) camera. In yet another embodiment, the system can be used to blend data from an LWIR camera and an SWIR camera with data from a camera sensitive to low light visible. It will be understood that the invention is not limited to any particular type of camera and can be used to blend image data from cameras or other video sensors of the many types used in association with aviation and other transportation systems.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. An imaging apparatus for imaging a scene, comprising:
   (a) a thermal imaging camera that includes an array of pixels and that senses thermal radiation within the scene;
   (b) a control circuit that is programmed to:
      (i) detect an area of high thermal energy within the image;
      (ii) define a region of interest having a predetermined number of pixels within the area of high thermal energy;
      (iii) determine an average temperature sensed by the predetermined number of pixels; and
      (iv) adjust each of the plurality of adjustable parameters to optimal settings corresponding to the average temperature;
   (c) an image generating circuit that is operationally coupled to the thermal imaging camera and that generates image data corresponding to a portion of the scene, the image data based on the optimal settings for the plurality of adjustable parameters;
   (d) a display configured to display the image data;
   (e) a visible light camera;
   (f) a CMOS sensitivity sensor that detects an intensity of visible light available to the visible light camera; and
   (g) a long wave-IR sensor that detects an intensity of infra-red energy available to the thermal imaging camera,
   wherein the image generating circuit is further programmed to blend image data from the thermal imaging camera with image data from the visible light camera proportionally based on the intensity of visible light available to the visible light camera and the intensity of infra-red energy available to the thermal imaging camera so as to generate blended image data that, when displayed, shows the scene so as to be optimally perceptible by a user.

2. The imaging apparatus of claim 1, wherein at least one of the visible light sensor and the long wave-IR sensor comprises a photo diode.

3. The imaging apparatus of claim 1, in which the thermal imaging system is employed on an aircraft and the control circuit is further programmed to analyze platform data and dynamically adjust at least one of the visible light camera and the thermal imaging camera based thereon.

4. The imaging apparatus of claim 1, wherein the plurality of adjustable parameters includes parameters selected from a list consisting of: histogram equalization, gain, contrast, sharpness and combinations thereof.

5. The imaging apparatus of claim 1, wherein the control circuit includes a memory that stores a lookup table that includes a plurality of average temperatures and an optimal set point for each of the adjustable parameters corresponding to each of the average temperatures and wherein the control circuit sets each parameter to the set point corresponding to the average temperature.

6. An imaging apparatus for imaging a scene, comprising:
   (a) a thermal imaging camera that includes an array of pixels and that senses thermal radiation within the scene;
   (b) a control circuit that is programmed to:
      (i) detect an area of high thermal energy within the image;
      (ii) define a region of interest having a predetermined number of pixels within the area of high thermal energy;
      (iii) determine an average temperature sensed by the predetermined number of pixels; and
      (iv) adjust each of the plurality of adjustable parameters to optimal settings corresponding to the average temperature;
      (v) sample a grid of evenly spaced-apart image units, each comprising a predetermined number of pixels, to determine an energy sensed by each of the image units;
      (vi) determine an energy threshold that defines the area of high thermal energy;
      (vii) compare the temperature sensed by each image unit to the energy threshold so as to determine an interface between the image units that sense energy above the threshold and the image units that sense energy not above the threshold; and
      (viii) designate a portion of the image that is on a side of the interface in which the image units that sense energy above the threshold as being the area of high thermal energy;
   (c) an image generating circuit that is operationally coupled to the thermal imaging camera and that generates image data corresponding to a portion of the scene, the image data based on the optimal settings for the plurality of adjustable parameters; and
   (d) a display configured to display the image data.

7. The imaging apparatus of claim 6, wherein the platform data include data indicative selected from a list consisting of: outside air temperature, indicated air speed, an aircraft mode of operation, and combinations thereof.

8. The imaging apparatus of claim 7, wherein the aircraft mode of operation is selected from a list consisting of: taxi, climb, cruse and descent.

9. An aircraft imaging apparatus for imaging a scene, comprising:
   (a) a visual light camera;
   (b) a temperature sensor that detects a temperature associated with the visual light camera;
   (c) a control circuit, including a memory, that adjusts a plurality of parameters associated with the visual light camera as a function of the temperature so as to generate an optimal image, the control circuit programmed to:
      (i) detect an area of high thermal energy within the image;
      (ii) sample a grid of evenly spaced-apart image units, each comprising a predetermined number of pixels, to determine an energy sensed by each of the image units;
      (iii) determine an energy threshold that defines the area of high thermal energy;
      (iv) compare the temperature sensed by each image unit to the energy threshold so as to determine an interface between the image units that sense energy above the threshold and the image units that sense energy not above the threshold; and
      (v) designate a portion of the image that is on a side of the interface in which the image units that sense energy above the threshold as being the area of high thermal energy.

10. The aircraft imaging apparatus of claim 9, further comprising:
   (a) a thermal imaging camera mounted on the aircraft that includes an array of pixels and that senses thermal radiation within the scene;
   (b) an image generating circuit that is operationally coupled to the thermal imaging camera and that generates an image onto a display that shows a portion of the scene, the image being affected by a plurality of adjustable parameters the plurality of adjustable parameters including: histogram equalization, gain, contrast and sharpness; and
(c) where the control circuit that is programmed to:
 (i) define a region of interest having a predetermined number of pixels within the area of high thermal energy and dynamically adjust the predetermined number of pixels in the region of interest based on platform data;
 (ii) determine an average temperature sensed by the predetermined number of pixels;
 (iii) store a lookup table that includes a plurality of average temperatures and an optimal set point for each of the adjustable parameters corresponding to each of the average temperatures; and
 (iv) adjust each of the plurality of adjustable parameters to an optimal setting corresponding to the average temperature by setting each parameter to the set point corresponding to the average temperature.

11. The aircraft imaging apparatus of claim 10, wherein the platform data includes data indicative selected from a list consisting of: outside air temperature, indicated air speed, aircraft modes of operation, and combinations thereof.

12. The aircraft imaging apparatus of claim 11, wherein the aircraft modes of operation are selected from a list consisting of: taxi, climb, cruse, descent, and combinations thereof.

13. An image blending system, comprising:
(a) a visible light camera that includes an array of pixels and that senses visible light within a scene;
(b) a thermal imaging camera that includes an array of pixels and that senses thermal radiation within the scene;
(c) a visible light sensitivity sensor that detects an intensity of visible light available to the visible light camera; and
(d) a long wave-IR sensor that detects an intensity of infra-red energy available to the thermal imaging camera;
(e) an image generating circuit that is operationally coupled to the visible light camera and the thermal imaging camera, the image generating circuit configured to blend image data from the thermal imaging camera with image data from the visible light camera proportionally based on the intensity of visible light available to the visible light camera and the intensity of infra-red energy available to the thermal imaging camera so as to generate blended image data that shows the scene so as to be optimally perceptible by a user; and
(f) a display configured to display the blended image data.

14. The imaging system of claim 13, wherein at least one of the visible light sensor and the long wave-IR sensor comprises a photo diode.

15. A method of calibrating a thermal imaging system that generates an image onto a display, the image being affected by a plurality of adjustable parameters, comprising the steps of:
(a) receiving an image of a scene from a thermal camera;
(b) detecting an area of high thermal energy within the image;
(c) defining a region of interest having a predetermined number of pixels within the area of high thermal energy;
(d) determining an average temperature sensed by the predetermined number of pixels;
(e) adjusting each of the plurality of adjustable parameters to an optimal setting corresponding to the average temperature;
(f) sampling a grid of evenly spaced-apart image units, each comprising a predetermined number of pixels, to determine an energy sensed by each of the image units;
(g) determining an energy threshold that defines the area of high thermal energy;
(h) comparing the temperature sensed by each image unit to the energy threshold so as to determine an interface between the image units that sense energy above the threshold and the image units that sense energy not above the threshold; and
(i) designating a portion of the image on a side of the interface in which the image units that sense energy above the threshold as being the area of high thermal energy.

16. The method of claim 15, wherein the adjusting step comprises:
(a) accessing a memory that stores a lookup table that includes a plurality of average temperatures and an optimal set point for each of the adjustable parameters corresponding to each of the average temperatures; and
(b) setting each of the adjustable parameters to the optimal set point corresponding to the average temperature.

17. The method of claim 15, wherein the plurality of adjustable parameters includes parameters selected from a list consisting of: histogram equalization, gain, contrast, sharpness and combinations thereof.

18. The method of claim 15, in which the thermal imaging system is employed on an aircraft and further comprising the step of analyzing platform data and dynamically adjusting the predetermined number of pixels in the region of interest based thereon.

19. The method of claim 18, wherein the platform data include data indicative selected from a list consisting of: outside air temperature, indicated air speed, aircraft modes of operation, and combinations thereof.

20. The method of claim 19, wherein the aircraft modes of operation are selected from a list consisting of: taxi, climb, cruse, descent, and combinations thereof.

21. A method of calibrating a thermal imaging system that generates an image onto a display, the image being affected by a plurality of adjustable parameters, comprising the steps of:
(a) receiving an image of a scene from a thermal camera;
(b) detecting an area of high thermal energy within the image;
(c) defining a region of interest having a predetermined number of pixels within the area of high thermal energy;
(d) determining an average temperature sensed by the predetermined number of pixels;
(e) adjusting each of the plurality of adjustable parameters to an optimal setting corresponding to the average temperature;
(f) receiving light from a visible light camera;
(g) detecting an intensity of visible light available to the visible light camera;
(h) detecting an intensity of infra-red energy available to the thermal imaging camera; and
(i) blending image data from the thermal imaging camera with image data from the visible light camera proportionally based on the intensity of visible light available to the visible light camera and the intensity of infra-red energy available to the thermal imaging camera so as to generate blended image data that, when displayed, shows the scene so as to be optimally perceptible by a user.

22. A method of generating a display, comprising the steps of:
(a) receiving an image of a scene from a thermal camera;
(b) detecting an intensity of visible light available to the visible light camera;
(c) detecting an intensity of infra-red energy available to the thermal imaging camera; and
(d) blending image data from the thermal imaging camera with image data from the visible light camera proportionally based on the intensity of visible light available to the visible light camera and the intensity of infra-red energy available to the thermal imaging camera so as to generate blended image data that, when displayed, shows the scene so as to be optimally perceptible by a user.

23. The imaging apparatus of claim 1, wherein the platform data include data indicative selected from a list consisting of: outside air temperature, indicated air speed, an aircraft mode of operation, and combinations thereof.

24. The imaging apparatus of claim 23, wherein the aircraft mode of operation is selected from a list consisting of: taxi, climb, cruse and descent.

25. The imaging apparatus of claim 6, wherein at least one of the visible light sensor and the long wave-IR sensor comprises a photo diode.

26. The imaging apparatus of claim 6, in which the thermal imaging system is employed on an aircraft and the control circuit is further programmed to analyze platform data and dynamically adjust at least one of the visible light camera and the thermal imaging camera based thereon.

* * * * *